("(12) United States Patent")
Ishitoya et al.

(10) Patent No.: US 10,060,398 B2
(45) Date of Patent: Aug. 28, 2018

(54) FUEL SUPPLY DEVICE

(71) Applicant: Kyosan Denki Co., Ltd., Koga, Ibaraki-pref. (JP)

(72) Inventors: Akihiro Ishitoya, Koga (JP); Akihiro Kimura, Koga (JP)

(73) Assignee: Kyosan Denki Co., Ltd., Koga, Ibaraki-pref. (JP)

( * ) Notice: Subject to any disclaimer, the term of this patent is extended or adjusted under 35 U.S.C. 154(b) by 81 days.

(21) Appl. No.: 15/019,126

(22) Filed: Feb. 9, 2016

(65) Prior Publication Data

US 2016/0236566 A1 Aug. 18, 2016

(30) Foreign Application Priority Data

Feb. 17, 2015 (JP) .................. 2015-028919

(51) Int. Cl.
| | | |
|---|---|---|
| B60K 15/035 | (2006.01) | |
| F02M 37/00 | (2006.01) | |
| B60K 15/03 | (2006.01) | |

(52) U.S. Cl.
CPC ......... *F02M 37/0023* (2013.01); *B60K 15/03* (2013.01); *F02M 37/0011* (2013.01); *F02M 37/0094* (2013.01); *B60K 2015/0325* (2013.01); *B60K 2015/03118* (2013.01); *B60K 2015/03217* (2013.01); *B60K 2015/03236* (2013.01); *B60K 2015/03289* (2013.01); *B60K 2015/03453* (2013.01)

(58) Field of Classification Search
CPC . F02M 37/0023; F02M 37/0094; B60K 15/03
USPC ....................................... 220/746
See application file for complete search history.

(56) References Cited

U.S. PATENT DOCUMENTS

| | | | |
|---|---|---|---|
| 5,392,804 A * | 2/1995 | Kondo ............. | B60K 15/03519 123/519 |
| 2008/0251134 A1 | 10/2008 | Miura | |
| 2012/0024853 A1* | 2/2012 | Kuwayama ............ | B60K 15/03 220/227 |
| 2012/0024868 A1* | 2/2012 | Menke .................. | B60K 15/03 220/653 |

(Continued)

FOREIGN PATENT DOCUMENTS

| | | |
|---|---|---|
| JP | 2008-248913 A | 10/2008 |
| JP | 2012-163043 A | 8/2012 |

(Continued)

OTHER PUBLICATIONS

U.S. Appl. No. 15/019,079, filed Feb. 9, 2016, Ishitoya et al.

*Primary Examiner* — Fenn C Mathew
*Assistant Examiner* — Don M Anderson
(74) *Attorney, Agent, or Firm* — Harness, Dickey & Pierce, P.L.C.

(57) ABSTRACT

A fuel supply device has a module installed in a fuel tank. The module has a cap and a support pillar arranged between the cap and a bottom of the fuel tank. The support pillar supports a suction filter and a level sensor to use the bottom of the fuel tank as a base point for defining proper positions. The cap supports a valve relevant to ventilation of the fuel tank. The valve is supported by a base portion. The valve is positioned in the support pillar. The valve and the support pillar are arranged to overlap each other along the height direction. Various components are arranged in the small cap.

10 Claims, 2 Drawing Sheets

(56) References Cited

U.S. PATENT DOCUMENTS

2012/0181293 A1\* 7/2012 Rinke .................... B60K 15/03
 220/694
2013/0075394 A1 3/2013 Suzuki

FOREIGN PATENT DOCUMENTS

| JP | 2013-029051 A | 2/2013 |
| JP | 2013-082427 A | 5/2013 |
| JP | 2014-141894 A | 8/2014 |

\* cited by examiner

FUEL SUPPLY DEVICE

CROSS REFERENCE TO RELATED APPLICATION

This application is based on Japanese Patent Application No. 2015-28919 filed on Feb. 17, 2015, the disclosure of which is incorporated herein by reference.

TECHNICAL FIELD

The disclosure in this description relates to a fuel supply device applied to a fuel tank for storing liquid fuel.

BACKGROUND

Patent Literature 1 discloses a fuel supply device. In this device, a fuel tank has an opening and a cap for covering the opening. The cap is used in order to install a component in the fuel tank, and a pillar-shaped member is installed between the cap and a bottom. Patent Literature 2 and Patent Literature 3 disclose examples of the component which should be installed in the fuel tank. Patent Literature 4 and Patent Literature 5 disclose snap-fit mechanisms in the fuel supply device. The content of Patent Literatures listed as prior art are used and incorporated by reference as description for technical components disclosed in this description.

CITATION LIST

Patent Literatures

Patent Literature 1: JP2013-29051A
Patent Literature 2: JP2013-082427A
Patent Literature 3: JP2008-248913A
Patent Literature 4: JP2012-163043A
Patent Literature 5: JP2014-141894A

SUMMARY

In the conventional technique, it is necessary to use a large cap in order to install a plurality of components in the cap. However, it is difficult to use a large cap. For example, a large cap lowers mechanical strength of the fuel tank. In addition, a large cap may cause an increase of transmission amount of a fuel component. In addition, a size of the cap is restricted due to an installed environment of the fuel tank or a configuration of the fuel tank. In the above viewpoint, or in the other viewpoint not mentioned above, further improvement of a fuel supply device is still demanded.

It is one of objects of disclosure to provide a fuel supply device which is capable of installing a plurality of components.

It is another one of objects of disclosure to provide a fuel supply device which is capable of installing a pillar shaped member and a component relevant to ventilation of the fuel tank.

The present disclosure employs the following technical means, in order to attain the above-mentioned object.

The disclosure provides a fuel supply device. The fuel supply device comprises: a cap which covers an opening on a fuel tank; and a support pillar disposed between the cap and a bottom of the fuel tank. The fuel supply device comprises a component container for arranging an component relevant to ventilation of the fuel tank to overlap the support pillar with respect to a height direction of the support pillar.

According to this fuel supply device, the component relevant to ventilation of the fuel tank can be supported with the cap. The component can be arranged to overlap with the support pillar with respect to the height direction of the support pillar. Accordingly, the support pillar and the component can be arranged compactly. Therefore, the support pillar and the component can be arranged on the small cap.

The above and other objects, features and advantages of the present disclosure will become more apparent from the following detailed description made with reference to the accompanying drawings.

DETAILED DESCRIPTION

Figure 1:
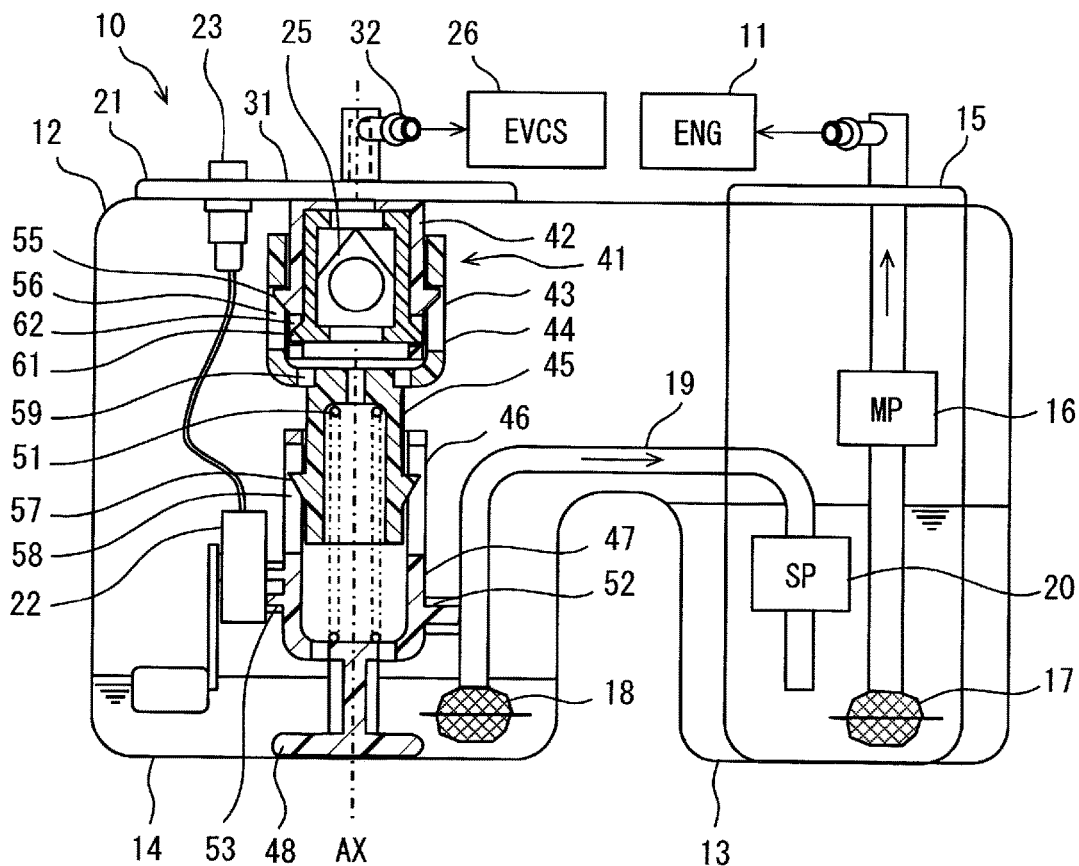
FIG. 1 is a cross-sectional view of a fuel supply device according to a first embodiment.

A plurality of embodiments is described referring to the drawings. In the embodiments, the same parts and components as those in each embodiment are indicated with the same reference numbers and the same descriptions will not be reiterated. In a consecutive embodiment, a correspondence is shown by using a similar reference symbol in which only hundred and more digits differ to indicate a part corresponding to a matter described in the previous embodiment, and the same description may not be repeated. The preceding description may be referred to for the part associated by the reference symbol. In a case that only a part of component or part is described, other descriptions for the other embodiment may be referenced or incorporated as descriptions for the remaining part of component or part.

First Embodiment

In FIG. 1, a fuel supply device 10 is mounted on a road motor vehicle. The fuel supply device 10 supplies a fuel to an internal combustion engine (ENG) 11 as a power source of the vehicle. The fuel supply system 10 has a fuel tank 12 for storing a fuel. The fuel tank 12 is so called a saddle type tank. The fuel tank 12 has a plurality of container sections on which a fuel accumulated. The fuel tank 12 has a first section 13 as main container section and a second section 14 as a sub container section at least.

The fuel supply device 10 has a plurality of tank modules for supporting a component which should be disposed in the fuel tank 12. In this embodiment, the first module 15 and the second module 21 are disposed in the fuel tank 12. Since the first module 15 supports a fuel pump, it may be called a main module or a pump module. Since the second module 21 supports a component for ventilation of the fuel tank 12, it may be called a sub-module or a ventilation module. Since the second module 21 supports an in-tank component for the second section 14, it may be called an additional module or a supplemental module.

The first module 15 pumps up a fuel from the fuel tank 12, and supplies it to the internal combustion engine 11. The first module 15 is disposed on the first section 13. The first module 15 has a main pump (MP) 16 driven by an electric motor. The first module 15 has a suction filter 17 disposed in the first section 13. The main pump 16 sucks a fuel from the suction filter 17. As a result, the main pump 16 supplies the fuel in the first section 13 to the internal combustion engine 11.

The first module 15 has an inter-section transport device for transporting the fuel in the second section 14 to the first section 13. The inter-section transport device is provided by a suction filter 18 disposed in the second section 14, a communicating passage 19 which communicates the second section 14 and the first section 13, and an auxiliary pump 20. The auxiliary pump 20 is disposed in the communicating passage 19, and transports the fuel in the second section 14 to the first section 13 through the communicating passage 19. The auxiliary pump 20 can be provided by a jet pump which uses the fuel pressurized by the main pump 16 as a power source, or a pump driven by an electric motor. For example, the auxiliary pump 20 is a jet pump which uses an excessive fuel returned to the fuel tank 12 from the internal combustion engine 11 as a power source.

The second module 21 is disposed on the second section 14. The second module 21 supports at least one in-tank component. The second module 21 supports the suction filter 18 and the communicating passage 19 as in-tank components. The second module 21 supports a level sensor 22 as an in-tank component. The level sensor 22 is a residual quantity sensor for measuring the fuel quantity which remains in the second section 14. The second module 21 supports an electric connector 23 for outputting electrical signal which indicates the fuel quantity detected by the level sensor 22.

The second module 21 supports component relevant to ventilation of the fuel tank 12. The second module 21 supports a valve 25 relevant to ventilation of the fuel tank 12. The valve 25 is a part of an evaporated fuel emission control system (EVCS) 26 The valve 25 controls communicating condition between an inside of the fuel tank 12 and EVCS 26. In the drawing, the valve 25 is illustrated as a symbol. The valve 25 controls discharge of gas from the fuel tank 12 in response to a height of the fuel level in the fuel tank 12. The valve 25 is a fueling control valve which contributes to adjust a fueling rate by controlling discharge of gas from the fuel tank 12 to EVCS 26. An example of the valve 25 is a float valve.

The valve 25 may be provided by the valves disclosed in JP2013-082427A or JP2008-248913. The content of the above listed documents are incorporated herein by reference as description for technical components disclosed in this description. The valve 25 may be provided by various valves, such as a rollover valve or an electromagnetic valve. The valve 25 may also be called as an EVCS valve, a fuel shut-off valve, or a ventilation valve.

The second module 21 has a cap 31 which covers the opening of the fuel tank 12. The cap 31 is made of resin. The cap 31 has a connecting pipe 32 for ventilation of the fuel tank 12. The inside of the fuel tank 12 is connected to EVCS 26 via the connecting pipe 32.

The second module 21 has a support pillar 41 arranged between the cap 31 and the bottom of the fuel tank 12. The support pillar 41 is a support mechanism which supports the component which should be installed in the fuel tank 12 by using the bottom of the fuel tank 12 as an installing base position for determining a proper position. The support pillar 41 is also a support mechanism for supporting the valve 25. The support pillar 41 is made of resin. The support pillar 41 has a telescopic mechanism in order to be adapted for an error of distance between the cap 31 and the bottom of the fuel tank 12. The telescopic mechanism is capable of extending and contracting about a height direction, and demonstrating a predetermined urging force in an extending direction. The support pillar 41 may be called a stay or a holder tower for the in-tank component.

The support pillar 41 has a base portion 42 which extends from the cap 31. The base portion 42 is a member formed in a cylindrical shape. The base portion 42 may be called a first cylindrical member. The base portion 42 is formed integrally with the cap 31 by a continuous material. The base portion 42 is also a support member which contains the valve 25 and supports the valve 25.

The support pillar 41 has an intermediate portion 43 which extends along the longitudinal direction of the support pillar 41. The intermediate portion 43 is a member formed in a cylindrical shape. The intermediate portion 43 may be called a second cylindrical member. The intermediate portion 43 is connected with the base portion 42 at one end, i.e., an upper end in the drawing. The intermediate portion 43 is connected with the below-mentioned distal end portion 46 at the other end, i.e., a lower end in the drawing.

The intermediate portion 43 has a large diameter part 44 to be connected with the base portion 42, and a small diameter part 45 to be connected with the distal end portion 46. The small diameter part 45 is formed in a cylindrical shape. The large diameter part 44 is formed in a cylindrical shape. The large diameter part 44 is formed to have a diameter larger than the base portion 42. The large diameter part 44 is placed to cover on an outside of the base portion 42. The large diameter part 44 and the base portion 42 are connected in an immovable manner in the axial direction. The large diameter part 44 is formed in a shape which may be called a cylindrical shape with a bottom or a cup. The large diameter part 44 is arranged to cover the base portion 42 and the valve 25 arranged there.

The support pillar 41 has the distal end portion 46. The distal end portion 46 is positioned to contact on the bottom of the fuel tank 12. The distal end portion 46 may be called a bottom portion. The distal end portion 46 has a connecting part 47 formed in a cylindrical shape and a leg portion 48 to be in contact with the bottom of the fuel tank 12. The distal end portion 46 may be called a third cylindrical member. The connecting part 47 is formed to have a diameter larger than the small diameter part 45. The connecting part 47 is placed to cover on an outside of the small diameter part 45. The small diameter part 45 and the connecting part 47 are connected in a movable manner in the axial direction. The small diameter part 45 and the connecting part 47 provide the telescopic device. The small diameter part 45 provides an inner tube for the telescopic device. The connecting part 47 provides an outer tube for the telescopic device. The connecting part 47 is formed in a shape which may be called a cylindrical shape with a bottom or a cup.

A compression spring 51 is accommodated between the intermediate portion 43 and the distal end portion 46. The compression spring 51 urges the intermediate portion 43 and the distal end portion 46 in an extending direction. Thereby, the support pillar 41 is fixedly arranged between the cap 31 and the bottom of the fuel tank 12.

The support pillar 41 has a support part 52 for supporting the inter-section transport device. The support part 52 is disposed on a distal end portion 46. The support part 52 positions the suction filter 18 on the bottom of the second section 14 by supporting the communicating passage 19. Since the suction filter 18 is disposed on an end opening of the communicating passage 19, the support part 52 positions the end opening of the communicating passage 19 on the bottom of the second section 14.

The support pillar 41 has a support part 53 for supporting the level sensor 22. The support part 53 is disposed on the distal end portion 46. The support part 53 positions the level sensor 22 on a regular height which is defined by using the bottom of the fuel tank 12 and a base position.

A snap-fit mechanism is disposed to connect the base portion 42 and the intermediate portion 43. The snap-fit mechanism connects them by using the elasticity of resin. The snap-fit mechanism is provided by a hook part and an engaging window which receives the hook part. As shown in the drawing, the hook part 55 is disposed on an outer surface of the base portion 42. The engaging window 56 is disposed on a cylindrical surface of the large diameter part 44 on the intermediate portion 43. The engaging window 56 is formed on a circumferential area corresponding to the hook part 55. The engaging window 56 receives the hook part 55 and engages with the hook part 55 at a regular axial position.

A snap-fit mechanism is disposed to connect the intermediate portion 43 and the distal end portion 46. As shown in the drawing, a hook part 57 is disposed on an outer surface of the small diameter part 45 of the intermediate portion 43. The engaging window 58 is disposed on the connecting part 47 of the distal end portion 46. The engaging window 58 is formed on a circumferential area corresponding to the hook part 57. The engaging window 58 is formed in a long shape in the axial direction to receive the hook part 57 and to allow a movement of the hook part 57 in the axial direction within a predetermined range. Thereby, it is possible to prevent a relative rotation while permitting a relative displacement in the axial direction between the intermediate portion 43 and the distal end portion 46.

Since the large diameter part 44 is placed to cover the base portion 42, the large diameter part 44 works as a member which protects the valve 25. The large diameter part 44 works to adjust an amount of liquid fuel which reaches directly to the valve 25 in the fuel tank 12. The large diameter part 44 has a plurality of through holes 59 which permit that gas component and liquid component in the fuel tank 12 reach to the valve 25. On the other hand, these through holes 59 are arranged to restrict reaching of liquid component to the valve 25, and to facilitate discharging of liquid component from the valve 25. In this embodiment, the engaging window 56 also works as one of the through holes 59.

The valve 25 and the base portion 42 are connected by a snap-fit mechanism. The valve 25 has a hook part 61 on an outer surface. The base portion 42 has an engaging window 62 on a circumferential area corresponding to the hook part 61. The engaging window 62 is formed to be engaged with the hook part 61 in a condition where the valve 25 is positioned in a regular position.

According to this embodiment, the component container for containing the component relevant to ventilation of the fuel tank 12, i.e., the valve 25 is defined by the base portion 42. The component container is disposed in the base portion 42. The component container is arranged to overlap with the support pillar 41 with respect to the height direction of the support pillar 41. The component container is arranged between the telescopic device of the support pillar 41 and the cap 31.

Figure 2:
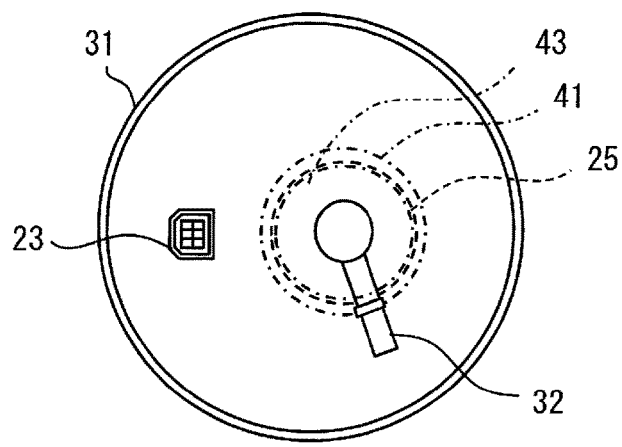
FIG. 2 is a plan view of a cap according to the first embodiment.

In FIG. 2, a plan view viewing the cap 31 from above is illustrated. An axis AX in a movable direction of the valve 25, i.e., the up and down direction, and an axis in the longitudinal direction of the support pillar 41, i.e., an axis AX of the telescopic device are arranged in a coaxial manner. The valve 25 is contained in an inside of the support pillar 41. In this structure, an area occupied by the valve 25 and an area occupied by the support pillar 41 overlap with respect to a projected area in the axial direction. One area and the other area are in a relationship in which one area includes the other one area.

According to this structure, a plurality of components 18, 19, 22, 23, and 25 can be installed within the small cap 31. The suction filter 18, the communicating passage 19 and the level sensor 22 are installed on the cap 31. The suction filter 18, the communicating passage 19 and the level sensor 22 are components which should be installed by using the bottom of the fuel tank 12 as a base point for defining proper positions. The valve 25 as a component relevant to ventilation of the fuel tank 12 is also installed on the cap 31. The valve 25 is positioned within the support pillar 41. The valve 25 and the support pillar 41 are arranged to overlap each other along the height direction.

Second Embodiment

This embodiment is one of modifications based on a basic form provided by the preceding embodiment. In the preceding embodiment, the valve 25 and the support pillar 41 are arranged on the same axis. Alternatively, in this embodiment, the valve 25 and the support pillar 41 are arranged to shift a little.

Figure 3:
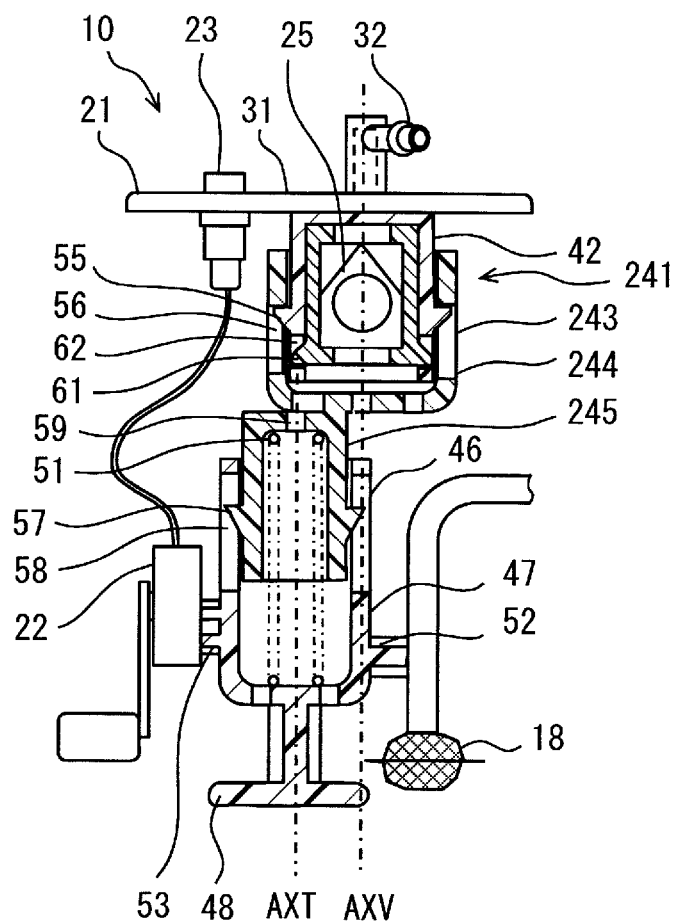
FIG. 3 is a cross-sectional view of a fuel supply device according to a second embodiment.
Figure 4:
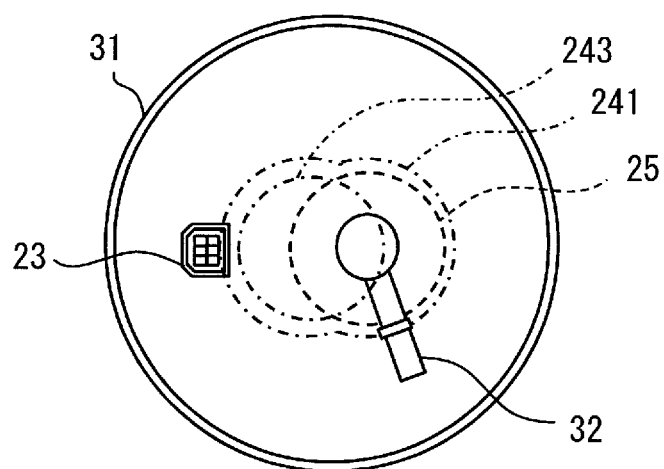
FIG. 4 is a plan view of a cap according to the second embodiment.

As shown in FIG. 3 and FIG. 4, the support pillar 241 has an intermediate portion 243 in which a large diameter part 244 and a small diameter part 245 are shifted in those radial directions. The support pillar 241 has the axes shifted in the radial direction. An axis AXT of the telescopic device provided by the small diameter part 245 and the distal end portion 46 of the support pillar 241 is shifted in the radial direction from an axis of the base portion 42, i.e., the axis AXV of the valve 25.

In this structure, an area occupied by the valve 25 and an area occupied by the support pillar 41 also overlap with respect to a projected area in the axial direction. The area occupied by the valve 25 and the area occupied by the support pillar 41 may be considered to be overlapped partially at least. Such arrangement makes it possible to arrange various components within a limited area provided by the cap 31.

Other Embodiments

The present disclosure is not limited to the above embodiments, and the present disclosure may be practiced in various modified embodiments. The present disclosure is not limited to the above combination, and disclosed technical means can be practiced independently or in various combinations. Each embodiment can have an additional part. The part of each embodiment may be omitted. Part of embodiment may be replaced or combined with the part of the other embodiment. The configurations, functions, and advantages of the above-mentioned embodiments are just examples. The technical scope of disclosure is not limited to the embodiment. Some extent of the disclosure may be shown by the scope of claim, and also includes the changes, which is equal to and within the same range of the scope of claim.

For example, the support pillars 41 and 241 may be formed by combining much more members. For example, the base portion 42 may be provided by a cylindrical member which is separatable from the cap 31. The intermediate portions 43 and 243 may be provided by a plurality of cylindrical members.

The support pillars 41 and 241 may support an auxiliary pump 20. In addition, the second module 21 containing the support pillars 41 and 241 may support a sub-tank for collecting fuel in the second section 14. In this case, the support pillar may be formed as a thick cylindrical column which may have almost the same diameter as the cap 31.

What is claimed is:

1. A fuel supply device comprising:
    a cap which covers an opening on a fuel tank; and
    a support pillar disposed between the cap and a bottom of the fuel tank, wherein the support pillar comprises:
        a base portion which has a cylindrical portion and extends towards an inside of the fuel tank from the cap;
        an intermediate portion which has a cylindrical portion connected with the cylindrical portion of the base portion; and
        a distal end portion connected with the intermediate portion and capable of being in contact with the bottom of the fuel tank, wherein
    the support pillar has a telescopic device which is capable of extending and contracting about a height direction, the telescopic device being arranged between the intermediate portion and the distal end portion,
    the support pillar has a component container for arranging a valve, which is a part of an evaporated fuel emission control system, the component container being arranged between the cylindrical portion of the base portion and the cylindrical portion of the intermediate portion, and
    the cylindrical portion of the intermediate portion has a cylindrical diameter part which is larger than the cylindrical portion of the base portion and is placed to cover an outside of the cylindrical portion of the base portion.

2. The fuel supply device in claim 1, wherein
    the cylindrical diameter part of the intermediate portion has a plurality of through holes which permit that a fuel reaches to the component container.

3. The fuel supply device in claim 1, wherein
    the support pillar and the component container have the same axis.

4. The fuel supply device in claim 1, wherein
    the telescopic device has an axis which is shifted in a radial direction from an axis of the valve.

5. The fuel supply device in claim 1, wherein
    the distal end portion has a support part which supports a communicating passage with a suction filter or a level sensor to be installed by using the bottom of the fuel tank as a base point.

6. The fuel supply device in claim 1, wherein the cap has a connecting pipe which connects an inside of the fuel tank and the evaporated fuel emission control system, and the base portion which is formed integrally with the cap by a continuous material and contains the valve, and wherein the valve controls communicating condition between the inside of the fuel tank and the evaporated fuel emission control system via the connecting pipe.

7. The fuel supply device in claim 1 further comprising:
    a snap-fit mechanism disposed to connect the base portion to the intermediate portion wherein a hook part disposed on an outer surface of the base portion is received by an engaging window formed in the cylindrical diameter part of the intermediate portion.

8. The fuel supply device in claim 7 further comprising:
    a snap-fit mechanism disposed to connect the intermediate portion to the distal end portion wherein a hook part disposed on an outer surface of the intermediate portion is received by an engaging window formed in the distal end portion.

9. The fuel supply device in claim 1 further comprising:
    a snap-fit mechanism disposed to connect the valve and the base portion wherein a hook part disposed on an outer surface of the valve is received by an engaging window formed in the cylindrical portion of the base portion.

10. The fuel supply device in claim 1, wherein the component container is disposed in the base portion and arranged to overlap with the support pillar with respect to a height direction of the support pillar.

* * * * *